March 18, 1969  W. E. JACOBSON  3,433,064
FLEXIBLE STRUCTURE FOR YIELDABLY WITHSTANDING FORCES
Filed May 23, 1967
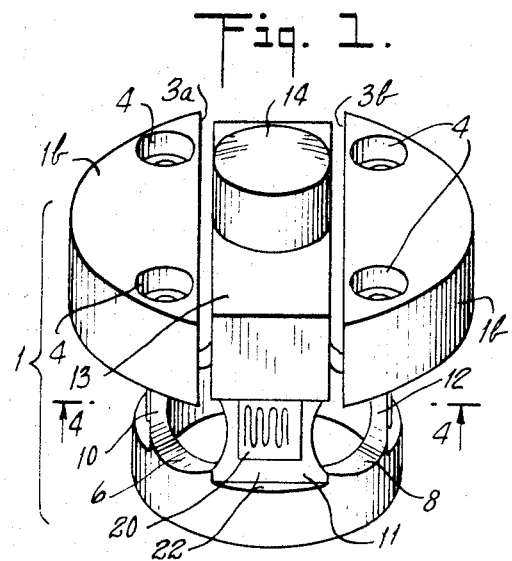
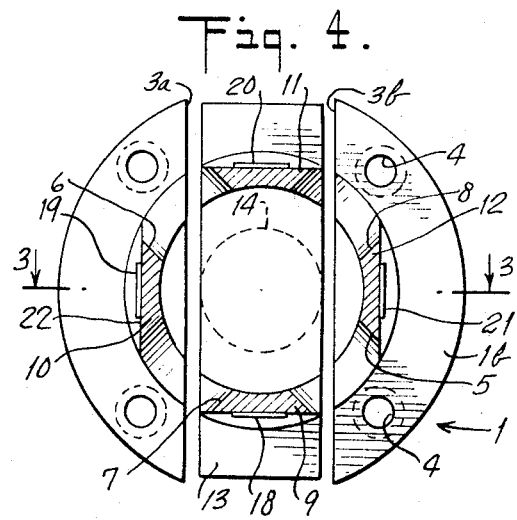
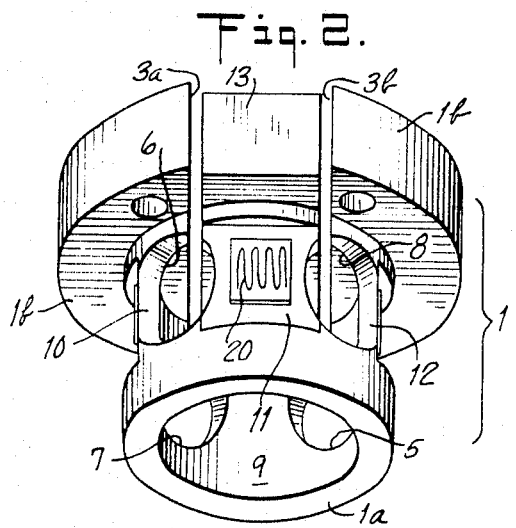
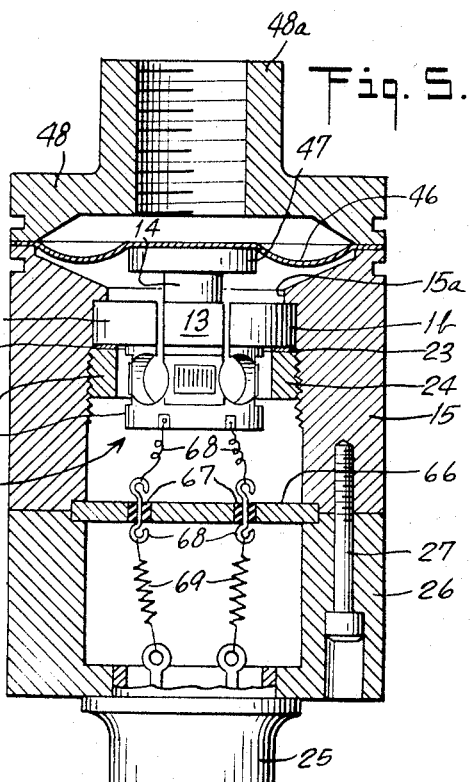
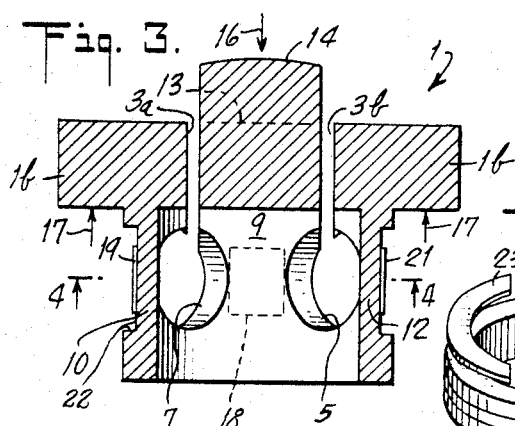
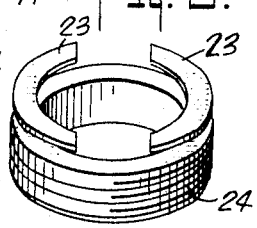
INVENTOR.
WALTER E. JACOBSON
BY
ATTORNEY

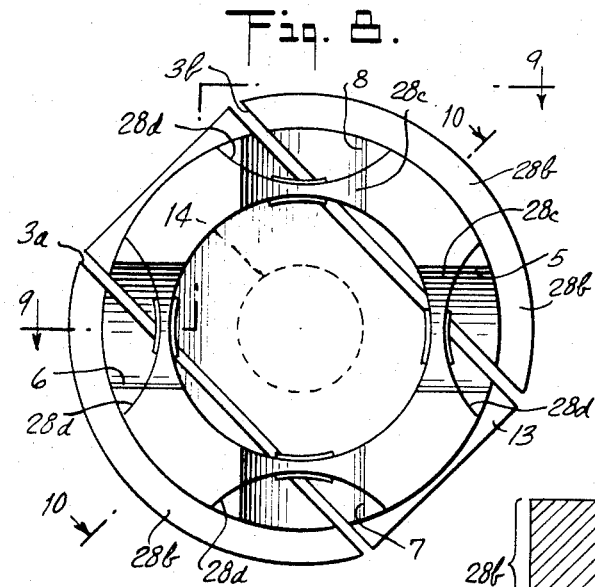
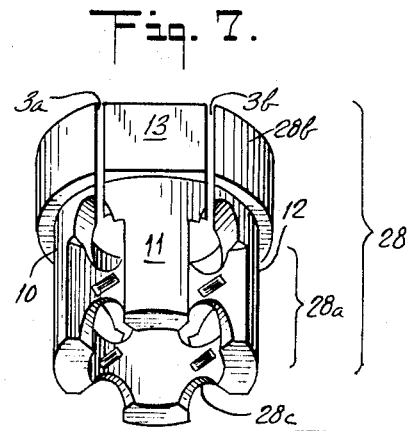
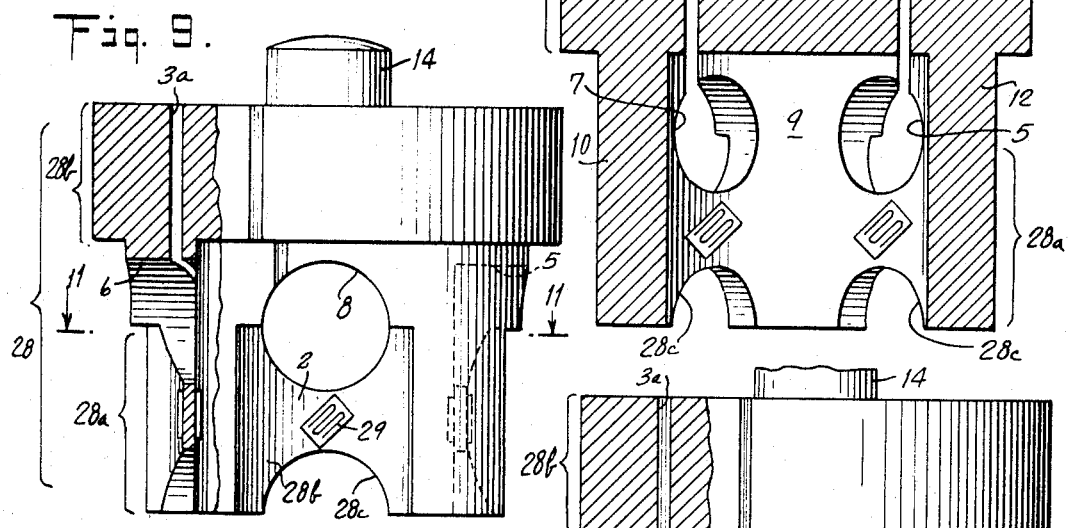
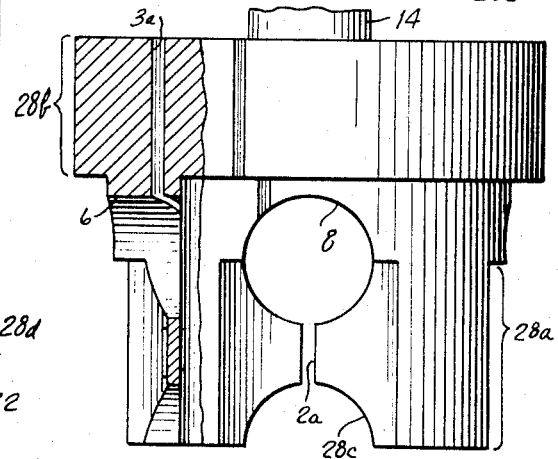
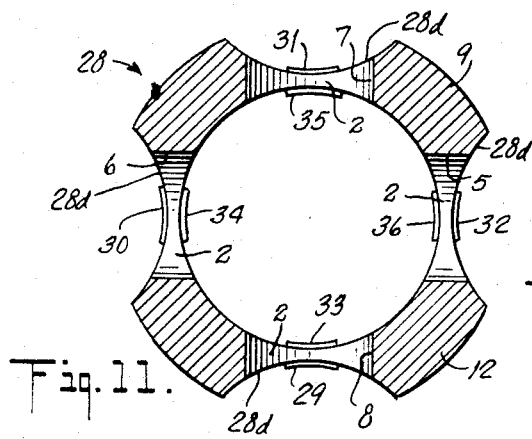
INVENTOR.
WALTER E. JACOBSON
BY
Lester H. Clark
ATTORNEY INVENTOR.
WALTER E. JACOBSON
BY Lester N. Clark
ATTORNEY

United States Patent Office 3,433,064
Patented Mar. 18, 1969

3,433,064
FLEXIBLE STRUCTURE FOR YIELDABLY WITHSTANDING FORCES
Walter E. Jacobson, Meriden, Conn., assignor to Revere Corporation of America, Wallingford, Conn., a corporation of New Jersey
Filed May 23, 1967, Ser. No. 640,669
U.S. Cl. 73—141          14 Claims
Int. Cl. G01l 5/00

ABSTRACT OF THE DISCLOSURE

Flexible structure for yieldably withstanding forces, i.e., to allow a limited movement of a force applying member with respect to a support. The flexible structure may be used as the strain sensitive element in a load cell. When the structure is so used, electrical strain gages are mounted on parts of the strain sensitive element. Forces may be measured by the load cell as a function of tension, compression, shear, or bending, depending upon location of strain gages on the strain sensitive element.

Load cell may be modified for use as pressure transducer. Overload protection of highly stressed parts may be provided. Another disclosed modification of the flexible structure may be used as a flexure, i.e., as a support which allows a limited movement of the suported structure in two degrees of freedom with respect to the supporting structure.

BACKGROUND OF THE INVENTION

There is disclosed in my Patent No. 3,261,204, issued July 19, 1966, force measuring apparatus of the load cell type which includes an integral strain sensitive element adapted to support a load and a plurality of electrical strain gages bonded to surfaces of the strain sensitive element so that their resistances change as a function of the applied load or force. In the load cells shown in that patent and in other load cells of the prior art, the strain sensitive element is commonly fashioned from an integral block of material, usually steel, by machining away parts of the block so as to concentrate stresses in remaining portions of the block. This machining operation is difficult, and requires close tolerances, and hence expert workmanship.

BRIEF SUMMARY OF THE INVENTION

The present invention concerns a flexible structure which is useful as the strain sensitive element in a load cell, or as a flexible support.

A flexible structure according to the invention is formed from an integral block of material, e.g., steel, by the removal of material from the block principally by relatively inexpensive operations, e.g., turning on a lathe, drilling, or sawing, as opposed to more expensive machining operations, e.g., milling and grinding. While some milling or grinding operations may be used, the contour of the structure permits the minimization of such operation.

In its simplest and presently preferred form, the flexible structure of the invention comprises a hollow cylinder with two pairs of diametrically opposite holes in the wall of the cylinder, each pair being aligned along an axis perpendicular to the cylinder axis, so that the axes of the pairs of holes intersect at the axis of the cylinder. The cylinder also has two slots extending longitudinally thereof from one end thereof, the slots being parallel to each other and to the cylinder axis, and each slot intersecting two adjacent holes in the cylinder wall.

A force receiving bridge member connects, preferably integrally, those portions of the cylinder between the slots at said one end. Another force receiving member (not necessarily integral) encircles that end of the cylinder and is connected to the portions of that end outside of the slots. Preferably, those portions have outwardly projecting flanges for attachment to said other force receiving member. The force to be measured, or the load to be supported, may be applied either to the bridge member or to the other force receiving member.

The holes and the slots cooperate with the inner and outer surfaces and the end surfaces of the cylinder to define: (1) peripheral web means on the cylinder at the other end from the slots; and (2) a plurality of longitudinal web means extending lengthwise of the cylinder and connecting the slotted end to the peripheral web means.

When my improved flexible structure is to be employed as a support (i.e., without any force measuring function), each longitudinal web is constructed to have an oblong cross-section with its long dimension radial with respect to the axis of the cylinder.

In the simplest embodiments of my flexible structure, two parallel slots are used, cooperating with two pairs of holes to define four longitudinal webs. In more complex structures, a larger number of longitudinal webs may be constructed. It is only necessary that the total number of longitudinal webs be an even number and that one of two sets of alternate longitudinal webs be connected to one of two force receiving members, while the other set of alternate longitudinal webs is connected to the other force receiving member.

When my improved strain sensitive element is used in a load cell, certain portions of the web means are reduced in cross-section to concentrate the stresses, and the strain gage elements are located at those reduced sections. The location of the reduced sections may be selected to measure the applied force as a function of either tension stress, compression stress, shear stress, or bending stress.

In any load cell, it is desired to measure only force components acting in a given direction, which is the direction of the cell axis, and the load cell should not respond to transverse components of forces acting at an angle to that axis (angular forces), i.e., components acting at right angles to that direction. Furthermore, the cell should measure forces parallel to the cell axis (eccentric forces) as long as their eccentricity is within a predetermined limit.

In load cells constructed in accordance with the invention, the proper response of the cell to eccentric forces and the proper lack of response to the transverse components of angular forces, are assured by positioning all the strain gages at the same distance from the surfaces on which the measured force and the reactive force act, at points which are equally spaced from the axis, and on surfaces of equal curvature. Furthermore, in all of the modifications except the one which responds to bending stress, the gages are equally angularly spaced about the axis. In the bending stress modification, the compression-stressed gages are equally angularly spaced, and the tension-stressed gages are equally angularly spaced.

Overload protection is provided so that if the force applied exceeds the capacity of the cell, that excess force is transmitted to the underlying support without passing through the weaker (reduced section) parts of the strain sensitive element.

DESCRIPTION OF THE DRAWINGS

FIG. 1 is a perspective view of a strain sensitive element for a load cell adapted to measure force as a function of compression or tension loads, and embodying my invention, looking downwardly from above and in front of the element;

FIG. 2 is a perspective view of the element of FIG. 1, looking upwardly from below and in front of the element;

FIG. 3 is a vertical cross-sectional view of the element of FIG. 1, taken on the line 3—3 of FIG. 4;

FIG. 4 is a horizontal cross-sectional view of the element of FIG. 1, taken on the line 4—4 of FIG. 3;

FIG. 5 is a central vertical sectional view of a pressure transducer utilizing the strain sensitive element of FIG. 1;

FIG. 6 is a perspective view, partly exploded, showing the overload protection mechanism in the pressure transducer of FIG. 5;

FIG. 7 is a view similar to FIG. 2, showing a modified form of strain sensitive element adapted to measure force as a function of shear stresses;

FIG. 8 is a bottom plan view of the element of FIG. 7, on a larger scale, and rotated through an angle of 45° about a vertical axis;

FIG. 9 is a view of the element of FIG. 7, partly in side elevation and partly in section, along the line 9—9 of FIG. 8;

FIG. 9A is a fragmentary view similar to a part of FIG. 9, illustrating a modification;

FIG. 10 is a cross-sectional view of the element of FIGS. 7 to 9, taken along the line 10—10 of FIG. 8;

FIG. 11 is a cross-sectional view taken along the line 11—11 of FIG. 9;

FIGS. 1–4

Figure 12:
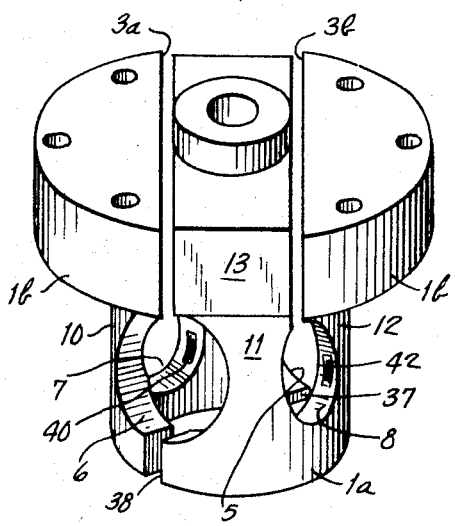
FIG. 12 is a perspective view of a strain sensitive element embodying a third modification of the invention, and adapted to measure force as a function of bending stresses.
Figure 13:
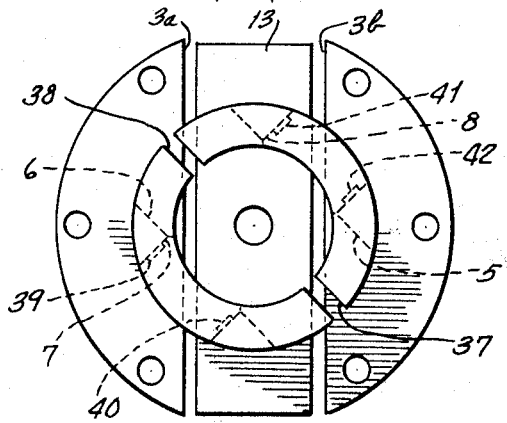
FIG. 13 is a bottom plan view of the element of FIG. 12.
Figure 14:
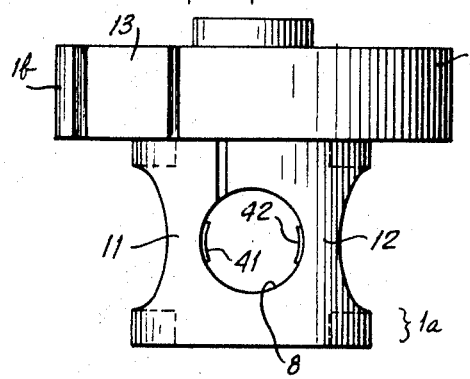
FIG. 14 is a side elevational view of the element of FIG. 12.
Figure 16:
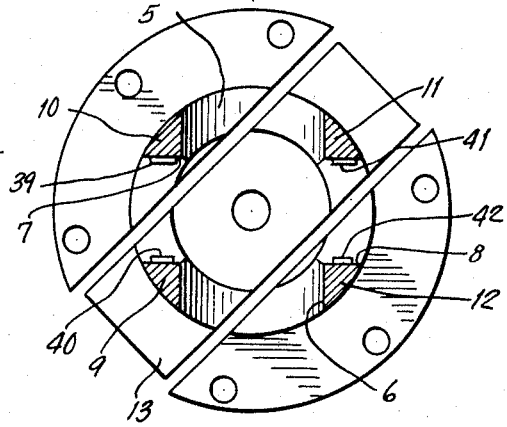
FIG. 16 is a cross-sectional view along the line 16—16 of FIG. 15.
Figure 15:
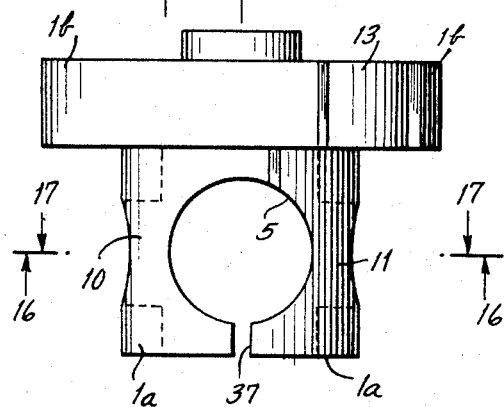
FIG. 15 is a side elevational view of the element of FIG. 12, taken at right angles to FIG. 14.
Figure 17:
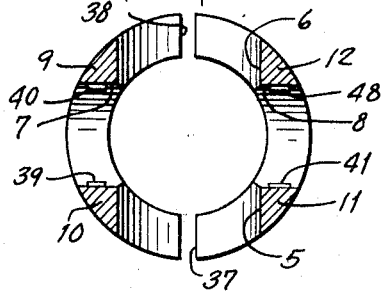
FIG. 17 is a cross-sectional view along the line 17—17 of FIG. 15.
Figure 18:
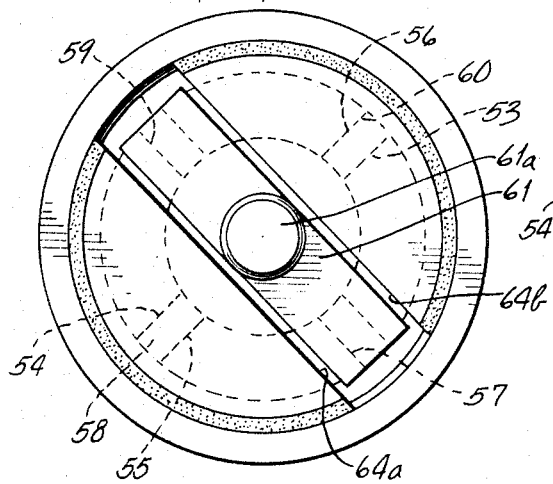
FIG. 18 is a plan view of a flexure embodying the invention.

These figures illustrate a strain sensitive element 1 for a load cell, constructed in accordance with the invention and adapted to measure either compression or tension loads. The element 1 is in the form of a hollow cylinder open at its lower end and closed at its upper end except for a pair of slots 3a and 3b. Two pairs of diametrically opposite holes 5, 6 and 7, 8 are bored or drilled through the cylinder at a locality spaced from the slotted end. Each pair of holes 5, 6 and 7, 8 is aligned along an axis perpendicular to the cylinder axis and the axes of the pairs of holes intersect at the axis of the cylinder.

It is preferred that the axes of the two pairs of holes intersect at right angles, and that the holes be of the same size, inasmuch as that arrangement provides for more equal stress distribution. Nevertheless, these preferred constructions are not absolutely necessary to the operability of a load cell constructed in accordance with the invention.

Each slot 3a, 3b intersects two adjacent holes in the cylinder. Referring to FIG. 4, it may be seen that the slot 3a intersects the holes 6 and 7 and the slot 3b intersects the holes 5 and 8.

The holes cooperate with the other surfaces of the cylinder to define a peripheral web 1a, which extends entirely around the end of the cylinder opposite the slots 3a, 3b. The holes 5, 6, 7, 8 and the slots 3a and 3b also cooperate with the other surfaces of the cylinder to define four longitudinal webs 9, 10, 11 and 12 extending lengthwise of the cylinder from the peripheral web 1a.

At the slotted end of the cylinder, there are provided means for receiving a force to be measured and transmitting it to the flexure element, and means for receiving a reactive force and transmitting to the flexure element.

The means for receiving the force to be measured comprises an integral bridge member 13 connecting the upper ends of the longitudinal webs 9 and 11, and a central upwardly projecting post 14 integral with the bridge member 13.

The means for receiving the reactive force is shown as comprising a pair of outwardly projecting flanges 1b on the upper ends of the longitudinal webs 10 and 12, and adapted for attachment to a support, e.g., by means of screw holes 4. The support (e.g., casing) 15 in FIG. 5 commonly encircles the flexure element 1. Obviously, other forms of connection may be used between the upper ends of the webs 10, 12 and the underlying support.

Thus, in a load cell utilizing a strain sensitive element 1, as illustrated in FIG. 1, the load to be measured would be applied to the center post 14, and may, for example, be a downwardly acting force as indicated by the arrow 16 in FIG. 3. The reaction force is then applied upwardly at the flanges 1b, as indicated by the arrows 17. Under those conditions, it may be seen that the longitudinal webs or columns 11 and 9 are stressed in compression and that the longitudinal webs 10 and 12 are stressed in tension.

If desired, the center post 14 could be constructed to receive an upwardly acting force, and the flanges 1b would then receive a downwardly acting reaction force. Furthermore, the force to be measured may be applied to the flanges 1b and the reactive force to the post 14.

Strain gage resistance elements 18, 19, 20 and 21 are mounted on the webs 9, 10, 11 and 12, respectively, on the outer surfaces thereof. Those outer surfaces may be machined away, as indicated at 22 (FIGS. 1 and 3) to reduce the amount of material in the webs and thereby make the load cell more sensitive. This machining also provides flat surfaces for the mounting of the strain gage elements. The strain gage elements may be connected in an electrical bridge circuit, for example, as described in my Patent No. 3,261,204, mentioned above.

A strain sensitive element 1, as illustrated in FIGS. 1–4, may be constructed from an integral block of metal almost entirely by means of turning and drilling operations with relatively expensive cutting and grinding operations minimized. For example, the surfaces of the cylinder and the flanges 1b may be formed by turning operations, as is the central post 14. The holes 5, 6, 7 and 8 are then formed by drilling operations. The slots 3a and 3b may be simply saw cuts. The only milling machine operation is at the ends of the bridge member 13 (see FIG. 4) to reduce its length so that it does not interfere with the structure which supports the flanges 1a, and the milled flats 22, on which the strain gage elements 18, 19, 20 and 21 are bonded. It is also acceptable to remove the material from the webs 9, 10, 11 and 12 by a turning operation.

All of the strain gage resistance elements 18, 19, 20 and 21 are at the same level in the strain sensitive element 1. That is to say, they are all located at the same distance along the direction of the applied force from the point where that force is applied, namely, the top of the post 14, as it appears in FIG. 3. Similarly, they are at the same distance in the direction of the reactive force from the location where that force is applied, namely, the bottom surfaces of the flanges 1b in FIG. 3. Furthermore, as best seen in FIG. 4, all four of the strain gages 18, 19, 20 and 21 are at the same radial distance from the axis of the strain sensitive element 1. Also, all four of the strain gages are located on surfaces of equal curvature. In this particular structure, the mounting surfaces are flat. It is not necessary that they all be flat, but the curvature of all four mounting surfaces should be the same. The four strain gage elements are also equally angularly spaced about the vertical axis of the strain sensitive element 1. That angular spacing is 90° between successive strain gage elements, as is readily observable in FIG. 4. Again, the particular angular spacing depends on the number of longitudinal webs, and will usually be equal to 360° divided by the number of such webs. It should be noted, however, that the strain gage elements on some of the webs may be omitted. For example, two diametrically opposite gage elements such as 18 and 20 in FIG. 4 could be omitted with a corresponding loss in sensitivity of the strain sensitive element.

If all four of these criteria are met, i.e., if all the strain gages are at the same level, are equally distant from the axis, on surfaces of equal curvature, and equally angularly spaced about the axis, then the accuracy of the strain sensitive element will not be adversely affected by eccentric loads, or by angular loads. Eccentric loads, as long as their eccentricity does not greatly exceed the diameter of the peripheral web 1a, will be accurately measured by the strain sensitive element, even though some of the longitudinal webs will be stressed more than others. The strain gages are connected in a bridge circuit, in a manner well known in the art, so that the effects of their resistance changes are additive in the bridge output. Consequently, the output of the bridge indicates the total load, even though that load may be somewhat eccentric.

Furthermore, if the load is angularly applied, i.e., if it acts at an angle to the axis of the cell rather than parallel to that axis, the effects of the angular component on the different strain gage elements will balance one another so that the angular load will not be included in the measured load. There are, of course, limits to the angularity at which the load may be applied without adversely affecting the accuracy of the measurement. Nevertheless, within the range of angularity normally expected in a load cell, the arrangement of the strain gage elements illustrated is effective to prevent measurement of the transverse component of the angularly applied load. The only component of the angularly applied load which is measured is that which is directed along the axis of the strain sensitive element.

FIGS. 5–6

FIG. 5 illustrates the strain sensitive element 1 of FIGS. 1–4 mounted in the housing 15 of a pressure transducer. The housing 15 is of generally annular cross-section, and is closed at its upper end by a flexible diaphragm 46, carrying on its under surface a disc 47, which preferably is integral with the center post 14 of the strain sensitive element. The diaphragm 46 is welded at its periphery to housing 15, and is enclosed by a cover 48 having an upwardly extending fitting 48a, which is internally threaded to receive a conduit through which passes the fluid whose pressure is to be measured.

The housing 15 is provided with an internal projection 15a against which the upper marginal surfaces of the flanges 2a are seated. The lower surfaces of the flanges 1b abut against a pair of shims 23 which are held in place by a ring 24 externally threaded to be received in an internally threaded central aperture in the housing 15. The lower end of housing 15 is closed by a cover 26 held in place by screws 27. The cover 26 has a central opening in which is received an electrical plug connector 25, of conventional construction. A metal header 66 is soldered at its edges to the housing 15, and has sealed thereto insulating bushings 67 supporting electrical connections 68 to the strain sensitive elements 18, 19, 20 and 21 (portions of those connections, common in the art, have been omitted to clarify the drawing.) The electrical connections 68 extend through the bushings to calibrating resistors 69 located in the cover 26 and thence to the plug connector 25. This arrangement allows ready replacement of the calibrating resistors 69 by simply removing the cover 26, without going inside the hermetically sealed unit enclosed between diaphragm 46 and header 66.

The force acting on the sensing element 1 is equal to the difference between the pressure acting on the upper surface of the diaphragm 46 and the pressure on the lower surface of the diaphragm 46 is multiplied by the effective area of the diaphragm. The force due to this pressure difference acts downwardly on the center post 14 and is resisted by the reaction force acting through the housing 15 on the flanges 1b. The present transducer may be mounted by the attachment of the fitting 48a to a rigid conduit. If the conduit is flexible, other support means may be employed, usually attached to the cover 48.

The space under the diaphragm 46 may be evacuated through a suitable conduit (not shown) and sealed, in which case the transducer measures absolute pressure, or it may be vented to the atmosphere, in which case the transducer measures gage pressure. Alternatively, the fitting 48a may be connected to a source of fluid at subatmospheric pressure.

The shims 23 do not extend under the ends of the bridge member 13, so that the latter is free to move downwardly under the influence of the applied pressure difference, until its projecting ends engage the upper surface of the ring 24. At that point, the force applied by the diaphragm 46 is carried by the bridge member 13 directly to the ring 23 and thence to the housing 15. Hence, the longitudinal web portions 9, 10, 11 and 12 and peripheral web 1b are not stressed additionally after the ends of the bridge 13 have engaged the ring 24. Hence those web portions are protected against overloads.

Where a strain sensitive element is to be used in a universal load cell, i.e., to take both upwardly and downwardly acting forces, and overload protection in both directions is desired, then two sets of shims 23 may be provided, one above the flanges 1b and one below.

Other spacer means equivalent to shims 23 may alternatively be used. For example, the ends of the bridge member 13 may be made thinner than the flanges 1b. However, the shims 23 have the advantage that their thickness may be changed during assembly by simply changing shims. Thereby, the maximum load carried by the strain sensitive element may be varied without resorting to a machining operation to change a dimension of that element.

FIGS. 7–11

These figures illustrate another strain sensitive element 28, usable in a load cell or pressure transducer constructed in accordance with the invention, on which strain gages 29, 30, 31, 32 are so located as to be stressed in shear rather than in compression or tension. In this modification, those parts which correspond in structure and function to their counterparts in FIGS. 1–4 will be given the same reference numerals and will not be further described. The strain sensitive element 28 includes a peripheral web 28a at its lower end and flanges 28b at its upper end.

In this modification, the peripheral web 28a at the lower end of the strain sensitive element has been modified from the web 1a shown in FIGS. 1–4. The web 28a is provided with semicylindrical recesses or scallops 28c aligned with each of the four holes 5, 6, 7 and 8 to leave four narrow neck sections 2 in the web. Furthermore, the outer periphery of the web 28 has been machined away to provide concave recesses 28d aligned with and connecting the scallops 28c and the four holes 5, 6, 7 and 8. The strain sensitive elements 29, 30, 31 and 32 are applied to the recesses 28d between each scallop 28c and the associated hole. If desired, an additional set of strain gage elements 33, 34, 35 and 36 may be applied to the internal surface of the cylinder opposite the externally applied strain gages 29, 30, 31 and 32, as best seen in FIG. 11.

The scallops 28c and the recesses 28d may be omitted, if desired, but the resulting load cell will be less sensitive for a given overall size.

The load is applied to the bridge portion 13 at the upper end of the load cell, e.g., through a post 14.

It may be seen that when the element 28 is stressed, by applying a load in one direction to the bridge 13 and in the opposite direction to the flanges 28b, one set of diametrically opposite longitudinal webs (i.e., one alternate pair of the webs 9, 10, 11, 12) is stressed in compression and the other set is stressed in tension, just as in the case of the load cell of FIGS. 1–4. However, the strain gages are now located in regions of the load cell which are stressed in shear. The strain gage elements may be connected in a bridge circuit so that their changes in resistance are additive, in a manner well known in the art.

If it is desired to modify the load cells of FIGS. 8–11 so as to reduce the capacity thereof, thereby increasing its sensitivity, two diametrically opposite narrow neck sections 2 of the peripheral web means 28a may be cut completely through as illustrated at 2a in FIG. 9A. There will then be only two narrow neck sections available for the application of resistance elements, and the shear stresses which were formerly carried by the four narrow neck sections will now be carried by the two narrow neck sections which remain uncut. These cuts or slots may be made by sawing.

As in the case of the strain gage elements 18, 19, 20, and 21 of FIGS. 1–4, it may be seen that the strain gage elements 29, 30, 31 and 32 are located at the same level. They are also located at equal distances from the central axis on surfaces of equal curvature and they are equally angularly spaced about the axis. The same is true of the second set of strain gages 33, 34, 35 and 36. Consequently, the accuracy of the force measurement is not affected by eccentricity of the load. Neither is the strain sensitive element effective to measure transverse components of angularly applied loads.

FIGS. 12–17

These figures illustrates another strain sensitive element constructed in accordance with the invention, in which the cell is so constructed and the strain gages so placed that they respond to bending stresses. The structure of the strain sensitive element is the same as that of FIGS. 1–4 except that a pair of diametrically opposite slots 37, 38 are cut through two diagramatically opposite narrow neck portions 2 of the peripheral web 1a. In the structure shown, the slots 37 and 38 intersect the diametrically opposite holes 5 and 6, respectively. Strain gage elements 39, 40, 41 and 42 are placed on the inside surfaces of the holes 7 and 8, being those two holes which are not intersected by slots 37 and 38.

In this arrangement, if a downward force is applied to the bridge 13, it stresses the diametrically opposite longitudinal web portions 11 and 9 in compression and the other two longitudinal web portions 10 and 12 in tension. These compression and tension forces are laterally restrained only by the peripheral web portions 1a, and hence tend to bend the longitudinal web portions, so that adjacent longitudinal web portions bend in opposite senses. Hence, the strain gage elements on the facing surfaces of the holes are subjected to the greatest bending stress in the longitudinal web portions, and are effective to measure that stress.

As in the case of the strain gages of FIGS. 1–4 and FIGS. 7–11, the strain gage elements 39, 40, 41 and 42 are located at the same distance from the points of application of the applied and reactive forces. They are also equally spaced from the axis of the strain sensitive element and are on surfaces of equal curvature. In this modification, the strain gages 40 and 41 are stressed in compression and the strain gages 39 and 42 are stressed in tension. Note that the two compression stressed gages 40 and 41 are spaced apart by equal angles (180°) and that the two tension stressed gages 39 and 42 are also angularly spaced by equal angles 180°. The spacing between the gages 40 and 42 is not the same as that between the gages 41 and 42, but it is not necessary that those spacings be equal, as long as all the compression gages are equally spaced and all the tension gages are equally spaced. If the gages are so located, the strain sensitive element has the characteristics of those previously described, in that it is effective to measure eccentrically applied loads and its accuracy is not affected by the presence of angularly applied force components.

In any of the strain sensitive elements constructed in accordance with my invention and disclosed above, the number of holes in the cylinder may be increased, as long as an even number is retained. As the number of holes increases, it becomes less necessary that the pairs of holes be located directly diametrically opposite. In other words, the tolerances with respect to alignment of opposite holes become less strict. As the number of holes increases, the number of slots must also be increased. The load to be measured must be applied to a means such as a bridge or spider connecting one set of alternate longitudinal webs, and the reactive force must be applied to some means connecting the other set of longitudinal webs.

FIGS. 18–21

These figures illustrate a flexible structure constructed in accordance with the invention and modified to provide a flexible support or flexure, wherein the supported structure has, within limits, two degrees of freedom with respect to the supported structure. The radial distance of freedom of movement is approximately equal throughout a range of 360°.

A flexure of the type illustrated may be used in series with a load cell to prevent the transmission of angular loads thereto. Typically, two such flexures are used with each load cell, one between the load cell and the supported load, and the other between the load cell and the structure which supports it.

Figure 20:
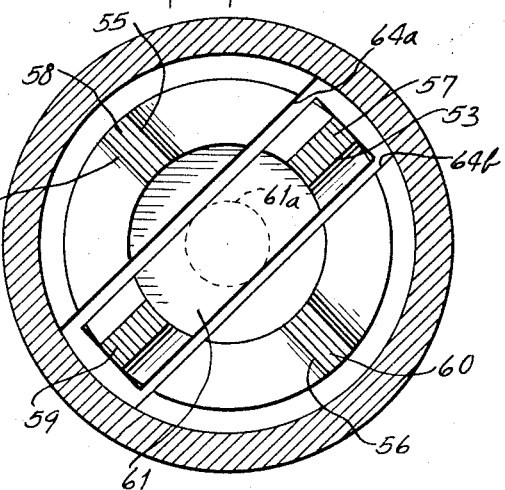
FIG. 20 is a cross-sectional view along the line 20—20 of FIG. 19.
Figure 19:
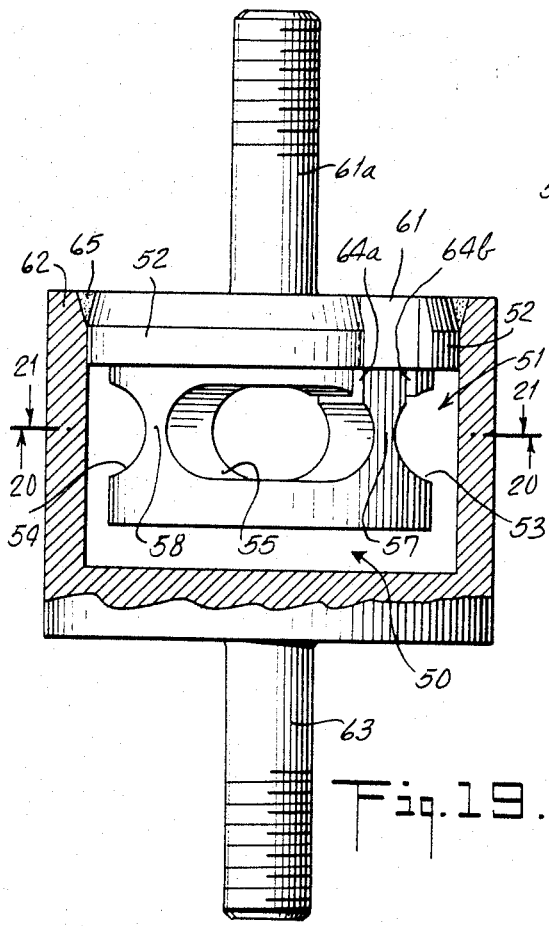
FIG. 19 is a view partly in elevation and partly in vertical cross-section, showing the flexure of FIG. 18.
Figure 21:
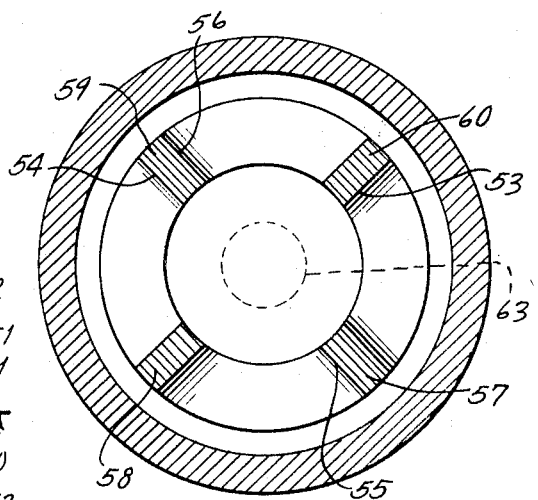
FIG. 21 is a cross-sectional view along the line 21—21 of FIG. 19.

Referring to FIG. 19, there is shown a flexure generally indicated at 50 and including a cylindrical portion 51 having a peripheral flange 52 extending around its upper edge. A pair of slots 64a and 64b extend longitudinally from the upper end of the cylinder. Two pairs of diametrically opposite holes 53, 54 and 55, 56 are cut through the walls of the cylinder. The axes of the two pairs of diametrically opposite holes intersect at the axis of the cylinder, as best seen in FIG. 21. The slot 64a intersects and connects the holes 54 and 55. The slot 64b intersects and connects the holes 53 and 56. The holes are so contoured as to leave between them longitudinally extending webs 57, 58, 59 and 60. These webs have substantially oblong cross-sections as best seen in FIGS. 20 and 21, with their long dimensions radial. The webs 57 and 59 are connected at their upper ends by a bridging member 61. A load applying post 61a extends upwardly from the center of the bridge member 61. The flanges 52 outside the slots 64a and 64b are welded, as at 65, to the rim of a cup 62, which encloses the cylinder 51. The bottom of cup 62 is provided with a downwardly extending post 63 for attachment to an underlying support.

It may be seen that a load to be supported may be mounted on the post 61a and that it can move within the lateral limits determined by the slots 64a and 64b. It can also move parallel to those slots by at least an equal distance. The resistance to its movement in any radial direction from the line of centers of the posts 61 and 63 is determined by the size and contour of the longitudinal webs 57, 58, 59 and 60. As long as those webs have equal cross-sections, and are equally spaced from the axis of the cylinder, then the two axes of rotation for the two degrees of freedom will intersect at the cylinder axis. In other words, the flexure provides two degrees of freedom with coincidental centers for both degrees.

FIG. 22

Figure 22:
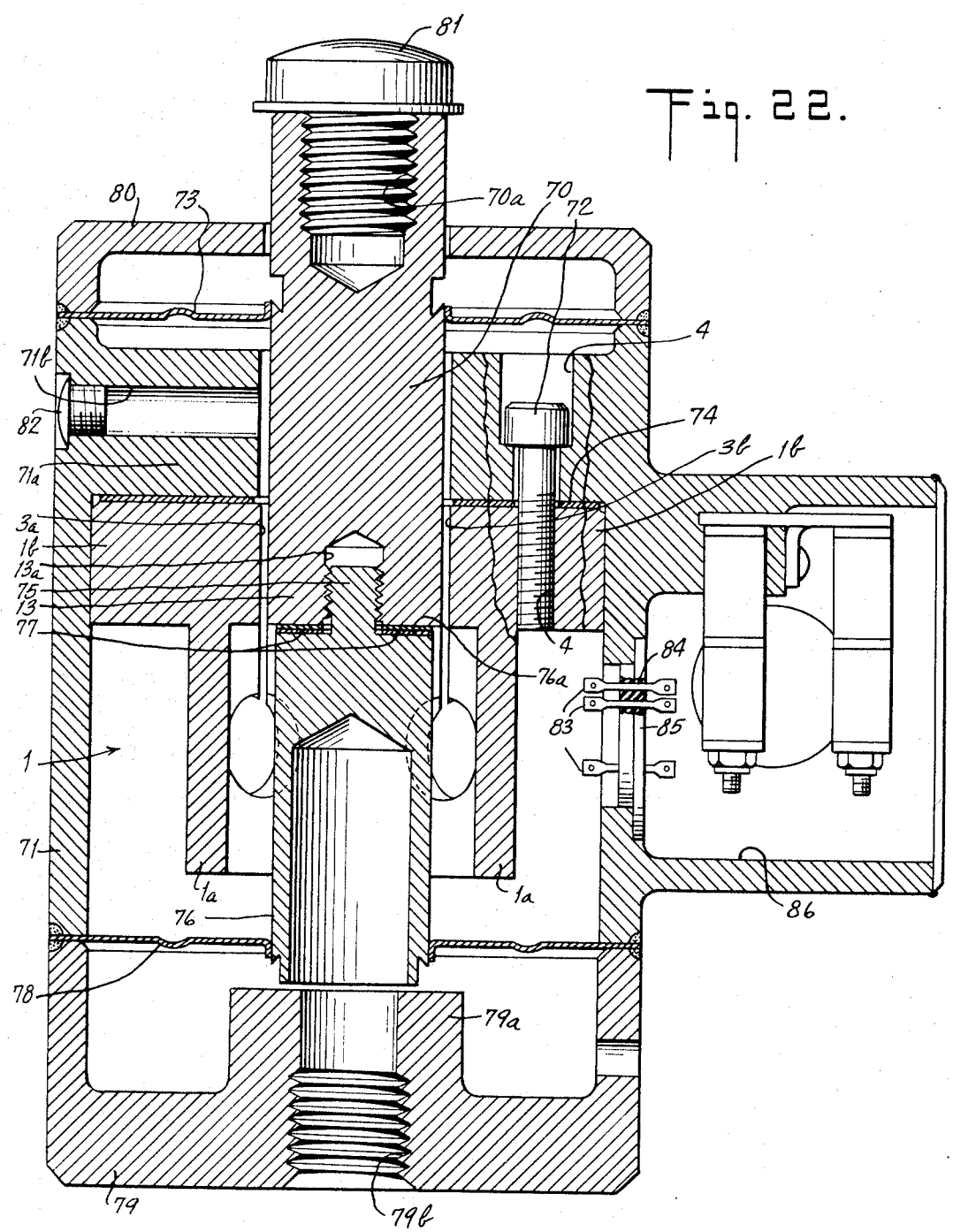
FIG. 22 is a central vertical sectional view of a load cell embodying the strain sensitive element of FIGS. 1–4.

This figure illustrates a complete universal load cell for measuring forces applied either in tension or compression, and utilizing the stress sensitive element 1 of FIGS. 1 to 4. The strain sensitive element 1 of FIG. 22 differs from that of FIG. 1 only in that its center post 70 is substantially longer than the post 14 of FIGS. 1–4. The strain sensitive element 1 is mounted in a tubular cylindrical housing 71 having an inwardly projecting flange 71a at its upper end. The element 1 is held in place in the housing 71 by means of a plurality of bolts 72, which engage the threaded holes 4 in the flanges 1b of the strain sensitive element.

At the upper end of the cylindrical housing 71, a flexible annular metal diaphragm 73 is welded at its periphery to the housing 71 and at its inner periphery to the central post 70.

Shims 74 are located between the upper surface of the strain sensitive element 1 and the inwardly projecting flange 71a. These shims determine the spacing between the ends of bridge 13 and the under surface of flange 71a and thereby the maximum amount of tension load which can be applied to the strain sensitive element 1. If that tension load is exceeded, then the ends of the bridge 13 close the gap and engage the under surfaces of the flange 71a, so that further tension loads are transferred directly from post 70 through bridge 13 to the flange 71a, and are not transmitted through the weaker stress measuring portions of the element 1. The bridge 13 has provided in its under surface a central aperture 13a in which is threaded a stud 75 formed on the upper end of an extension member 76. The extension member 76 is formed with a shoulder 76a encircling the stud 75. One or more shims 77 are provided between the shoulder 76a and the under surface of the bridge 13. The lower end of the extension member 76 projects below the peripheral web 1a. Another flexible metal diaphragm 78 is attached as by welding at its periphery to the lower end of the cylindrical housing 71, and is welded to the extension member 76 but spaced somewhat above that end.

A base 79 has an annular upwardly projecting flange which abuts against the under side of the diaphragm 78 in alignment with the wall of the tubular cylindrical housing 71. The base 79 is provided with a flat bottom surface so that it may rest on a suitable underlying support which supplies the ultimate reactive force to the load cell when it is stressed in compression. The base 79 is also provided with an upwardly projecting abutment 79a which is aligned with the lower end of the extension member 76.

When the load cell is stressed beyond the maximum compression load desired, the lower end of extension member 76 engages the abutment 79a so that any additional load applied to the cell is transmitted directly from the post 70 through extension member 76 and abutment 79a to the base 79 and does not pass through the weaker portions of the strain sensitive element 1. The particular value of load at which the extension member 76 engages the abutment 79a is determined by the shims 77.

It may be seen that the overload protection for both tension and compression loads may be adjusted during assembly of the load cell by simple addition or removal of shims either at 74 in the case of tension loads or at 77 in the case of compression loads. Consequently, it is not necessary to make any dimensional changes in the strain sensitive element 1 in order to provide required load limits.

The upper end of the load cell is enclosed by a cap 80 having a downwardly projecting peripheral flange which engages and is welded to the upper side of the diaphragm 73. The cap 80 has a central opening through which the upper end of the post 70 freely projects.

The diaphragms 73 and 78, although quite flexible in the vertical direction, are very stiff in the horizontal direction and permit little or no horizontal movement of the post 70 or of the extension 76. Consequently, transverse components of applied forces are transmitted directly from the post 70 through the diaphragms of the housing 71, and minimize the stress transferred to the weaker parts of the strain sensitive element 1.

The upper end of post 70 is provided with an internally threaded recess 70a which may be utilized to insert a threaded rod for applying a tension load to the cell. Alternatively, a compression load carrying button 81 may be threaded into the recess 70a.

The base 79 is also provided with an internally threaded central opening 79b for receiving the end of a threaded rod for applying a tension load to that end of the load cell.

The space within the load cell between the two diaphragms 73 and 78 may be evacuated through a passage 71b in the flange 71a. The passage 71b is closed after evacuation by a dished cap 82, which may be welded in place.

Electrical connections to the strain gage elements of the strain sensitive element 1 pass through connectors 83 supported by insulating bushings 84 in a metal header 85 which closes an opening in one side of the housing 71. Outside the header 85 is a chamber 86 in which are located calibrating resistance elements such as described in connection with FIG. 5.

While I have shown and described certain preferred embodiments of my invention, other modifications thereof will readily occur to those skilled in the art.

I claim:
1. Flexible support means, comprising:
 (a) means to receive an applied force;
 (b) means to receive an opposing reactive force;
wherein the improvement comprises:
 (c) an integral flexible structure connecting the two force receiving means, said integral flexible structure including:
  (1) a hollow cylinder having at least two pairs of diametrically opposite holes spaced from the ends of the cylinder, each pair being aligned along an axis perpendicular to the cylinder axis, said axes of the pairs of holes intersecting at the axis of the cylinder;
  (2) said cylinder having a plurality of slots extending longitudinally thereof from one end, each slot intersecting at least one of said holes;
  (3) said holes and said slots cooperating with the inner and outer surfaces and the end surfaces of the cylinder to define web means, including:
   (i) peripheral web means at the other end of the cylinder; and
   (ii) a plurality of longitudinal web means extending lengthwise of the cylinder and con- necting said one end to said peripheral web means;

(d) means connecting one of said force receiving means to one set of alternate longitudinal web means at said one end of the cylinder;

(e) means connecting the other force receiving means to the other set of alternate longitudinal web means at said one end of the cylinder;

(f) so that the stress due to said applied force is transmitted from said one force receiving means through said one set of alternate longitudinal web means to said peripheral web means and thence back through the other set of longitudinal web means to the other force receiving means.

2. Flexible support means defined in claim 1, in which:
(a) there are two pairs of diametrically opposite holes;
(b) there are two slots extending longitudinally from said one end and each intersecting two adjacent holes in the cylinder;
(c) said means connecting one of the force receiving means to one set of alternate longitudinal web means comprises a bridge spanning the cylinder and connecting the longitudinal webs between the slots; and
(d) said means connecting the other force receiving means to the other set of alternate longitudinal web means comprises a ring encircling the cylinder and connected to the other set of longitudinal web means outside the slots.

3. Flexible support means as defined in claim 1, in which:
(a) the longitudinal web means of said other set are provided with peripheral flanges at said one end of the cylinder; and
(b) said means connecting the other force receiving means to the other set of alternate longitudinal web means is a cup enclosing the other end of the cylinder and attached to said flanges.

4. Flexible support means as defined in claim 1, in which each of said longitudinal web means has a substantially oblong cross-section with its longest dimension extending radially with respect to the axis of the cylinder.

5. Flexible support means as defined in claim 4, in which:
(a) the longitudinal web means of said other set have peripheral flanges at said one end of the cylinder;
(b) said cylinder has only two pairs of diametrically opposite holes and two parallel slots extending longitudinally from said one end of the cylinder, each slot intersecting two adjacent holes;
(c) said means connecting one of said force receiving means to one set of alternate longitudinal web means comprises a bridge conecting the two longitudinal web means between the slots; and
(d) said means connecting the other force receiving means to the other set of alternate longitudinal web means comprises a cup encircling the other end of the cylinder and welded at its rim to the flanges.

6. Force measuring apparatus, comprising:
(a) a flexible structure effective in response to applied stresses to develop strains in portions thereof; and
(b) strain gage means operatively connected to said portions;
wherein the improvement comprises:
(c) said flexible structure, including:
(1) a hollow cylinder having at least two pairs of diametrically opposite holes spaced from the ends of the cylinder, each pair being aligned along an axis perpendicular to the cylinder axis, said axes of the pairs of holes intersecting at the axis of the cylinder;
(2) said cylinder having a plurality of slots extending longitudinally thereof from one end, each slot intersecting at least one of said holes;
(3) said holes and said slots cooperating with the inner and outer surfaces and the end surfaces of the cylinder to define web means, including:
(i) peripheral web means at the other end of the cylinder; and
(ii) a plurality of longitudinal web means extending lengthwise of the cylinder and connecting said one end to said peripheral web means;
(d) means to receive an applied force acting longitudinally of the cylinder and transmit it to one set of alternate longitudinal web means at said one end of the cylinder; and
(e) means to receive a reactive force opposing said applied force and transmit it to the other set of alternate longitudinal web means at the said one end of the cylinder.

7. Force measuring apparatus as defined in claim 6, in which said strain gage means includes strain gage elements attached to the outer surfaces of said longitudinal web means and operable to measure the applied force as a function of either compression or tension stresses in said longitudinal web means.

8. Force measuring apparatus as defined in claim 6, in which said strain gage means includes strain gage elements attached to said peripheral web means and aligned longitudinally of the cylinder with said holes, so as to measure the applied force as a function of shear stresses in said peripheral web means.

9. Force measuring apparatus as defined in claim 6, in which:
(a) said peripheral web means is provided with slots extending longitudinally of the cylinder and intersecting one set of peripherally alternate holes; and
(b) said strain gage means includes strain gage elements located on the interior surfaces of those holes which are not intersected by said last-mentioned slots;
(c) so that said strain gage elements are stressed in bending in response to said applied load.

10. Flexible support means as defined in claim 1, in which:
(a) all of said plurality of longitudinal web means are provided with outwardly projecting flanges at said one end of the cylinder;
(b) one of said connecting means comprises a ring encircling said cylinder and aligned with said flanges; and
(c) overload protection means comprising spacer means between said one connecting means and the flanges of one set only of said alternate longitudinal web means;
(d) the flanges on the other set of alternate longitudinal web means being effective upon an overload determined by the thickness of said spacer means to engage said ring directly, so that the forces are transmitted between said two force receiving means without further stressing said web means.

11. Flexible support means as defined in claim 1, including:
(a) an extension member attached to one of said connecting means and extending through said cylinder and beyond the other end thereof;
(b) an abutment on one of said force receiving means, aligned with said extension and adapted to be engaged thereby when the stress on said flexible structure exceeds a predetermined value; and
(c) shim means between said extension member and said one connecting means by which said predetermined value of force may be adjusted.

12. Force measuring apparatus as defined in claim 6, in which said strain gage means comprises a plurality of strain gage elements located on said web means, the respective strain gage elements being at equal distances from the nearest force receiving means, all said elements being equally spaced from the axis of the cylinder, and on surfaces of equal curvature.

13. Force measuring apparatus as defined in claim 12, in which said strain gage elements are equally angularly spaced about the axis of the cylinder.

14. Force measuring apparatus as defined in claim 12, in which some of said gages are stressed in tension and are equally angularly spaced about the cylinder axis, and other gages are stressed in compression and are also equally angularly spaced about said cylindrical axis.

References Cited

UNITED STATES PATENTS 3,303,450    2/1967    Brackett    338—2
3,300,745    1/1967    Walter    338—4

RICHARD C. QUEISSER, *Primary Examiner.*

J. WHALEN, *Assistant Examiner.*

U.S. Cl. X.R.

73—94; 338—2, 5, 6; 330—51; 324—123